United States Patent
Moman et al.

(10) Patent No.: US 7,094,726 B2
(45) Date of Patent: Aug. 22, 2006

(54) CATALYST COMPOSITION AND PROCESS FOR OLEFIN POLYMERIZATION AND COPOLYMERIZATION USING SUPPORTED METALLOCENE CATALYST SYSTEMS

(75) Inventors: Akhlaq Moman, Riyadh (SA); Orass Hamed, Riyadh (SA); Atieh Abu-Raqabah, Riyadh (SA)

(73) Assignee: Saudi Basic Industries Corp., Riyadh (SA)

( * ) Notice: Subject to any disclaimer, the term of this patent is extended or adjusted under 35 U.S.C. 154(b) by 195 days.

(21) Appl. No.: 10/445,474

(22) Filed: May 27, 2003

(65) Prior Publication Data

US 2003/0216530 A1 Nov. 20, 2003

Related U.S. Application Data

(63) Continuation of application No. 09/685,173, filed on Oct. 10, 2000, now abandoned.

(51) Int. Cl.
*B01J 31/16* (2006.01)

(52) U.S. Cl. .................. 502/152; 502/104; 502/103; 502/115; 526/348; 526/160; 526/943

(58) Field of Classification Search ............... 502/152, 502/104, 103, 115; 526/348, 160, 943
See application file for complete search history.

(56) References Cited

U.S. PATENT DOCUMENTS

| | | | |
|---|---|---|---|
| 4,173,547 A | 11/1979 | Graff | |
| 5,183,867 A | 2/1993 | Welborn | |
| 5,595,950 A | 1/1997 | Sagar | |
| 5,602,217 A | 2/1997 | Jejelowo | |
| 5,624,878 A | 4/1997 | Devore | |
| 5,625,015 A | 4/1997 | Brinen | |
| 5,677,401 A | * 10/1997 | Kataoka et al. | ............ 526/153 |
| 5,707,914 A | 1/1998 | Kataoka | |
| 5,750,454 A | 5/1998 | Shimizu | |
| 5,763,549 A | 6/1998 | Elder | |
| 5,795,839 A | 8/1998 | Kataoka | |
| 5,807,939 A | 9/1998 | Elder | |
| 5,853,642 A | 12/1998 | Siedle | |
| 5,885,924 A | 3/1999 | Ward | |
| 5,916,982 A | 6/1999 | Nakazawa | |
| 6,288,182 B1 | 9/2001 | Hamed | |
| 6,403,520 B1 | 6/2002 | Hamed | |

FOREIGN PATENT DOCUMENTS

| | | |
|---|---|---|
| EP | 0295312 | 12/1988 |
| EP | 0436326 | 7/1991 |
| WO | WO9837108 | 8/1988 |

OTHER PUBLICATIONS

Database WPI, Derwent Publications Ltd., WO 9837108, Aug. 27, 1998, Buna Sow Leuna Olefinverbund GmbH.

* cited by examiner

*Primary Examiner*—Ling-Sui Choi
(74) *Attorney, Agent, or Firm*—Kramer Levin Naftalis & Frankel LLP

(57) ABSTRACT

A catalyst composition includes: A) a solid catalyst precursor containing a metallocene compound, a magnesium compound and a particulate polymeric material; and B) a cocatalyst containing aluminum compound. The catalyst is prepared by combining metallocene compound, magnesium compound and particles of polymeric material to form a catalyst precursor; and activating the catalyst precursor with alkylaluminums and/or aluminoxanes. Homopolymeric or copolymeric polyolefins are produced by contacting olefins or olefins and alpha-olefins with the catalyst composition.

30 Claims, No Drawings

US 7,094,726 B2

CATALYST COMPOSITION AND PROCESS FOR OLEFIN POLYMERIZATION AND COPOLYMERIZATION USING SUPPORTED METALLOCENE CATALYST SYSTEMS

This application is a continuation of U.S. application Ser. No. 09/685,173, filed Oct. 10, 2000, now abandoned, incorporated herein by reference.

BACKGROUND OF THE INVENTION

1. Field of the Invention

This invention relates to new supported olefin polymerization catalyst systems, methods of producing the catalysts and processess of polymerizing and copolymerizing alpha-olefins. More particularly, this invention relates to the preparation of catalyst compositions comprising a metallocene compound, a magnesium containing compound and a polymeric material.

2. Description of the Prior Art

Several publications are referenced in this application. These references describe the state of the art to which this invention pertains, and are incorporated herein by reference.

The field of olefin polymerization catalysis has witnessed many remarkable discoveries during the last 50 years. In particular, two broad areas of invention have emerged: first, the discovery of Ziegler-Natta catalysts in the 1950's, which are still being used extensively in the polyolefin industry; second and more recently, the discovery of the highly active metallocene-based catalysts. Since these discoveries, ongoing research has been conducted to improve the performance of the catalysts.

Despite progress in these areas, the catalysts previously known in the art still have limitations. For example, conventional Ziegler-Natta catalysts often display limited activity, which is reflected in high catalyst residues. On the other hand, the metallocene-based catalysts intrinsically posses high activity, although the catalyst precursors and in particularly the cocatalysts required for polymerization, such as aluminoxanes or borane compounds, are very expensive. Another limitation that both systems share is the lengthy method of preparation.

Traditionally, the active components of both Ziegler-Natta and metallocene catalysts are supported on inert carriers to improve and control the product morphology in olefin polymerization. Magnesium chloride and silica have predominantly been used for the preparation of supported olefin polymerization catalysts.

U.S. Pat. No. 4,173,547 describes preparing a supported catalyst for olefin polymerization by treating silica with both an organoaluminum and an organomagnesium compound. The treated support is then contacted with a titanium tetrachloride.

However, procedures typically used for the preparation of suitable magnesium chloride and silica supports, such as spray drying or recrystallization processes, are complicated and expensive. Hence, methods of catalyst preparation previously described have the inconvenience of being complicated and expensive, and these methods do not allow consistency of particle size and particle size distribution. Also, despite the extensive and increasing use of supports for olefin polymerization catalysts, the previously used support materials themselves have several deficiencies. For example, in the case of silica, high calcination temperatures are required to remove water which is a common catalyst poison. This represents a significant proportion of the preparation time of the catalyst. Furthermore, in addition to the calcination treatment of silica, silica supported metallocene catalyst preparations typically require chemical treatment, namely the use of expensive aluminoxane or borane compounds in catalyst preparation U.S. Pat. Nos. 5,625,015 and 5,595,950 describe a catalyst system in which silica is contacted with an aluminoxane prior to the deposition of the metallocene component.

U.S. Pat. No. 5,624,878 describes direct coordination of a Lewis basic silica to $B(C_6F_5)_3$ in the presence of an amine reagent. In addition to the expense associated with the aluminoxane or borane, this catalyst preparation procedure itself is complicated and expensive.

The use of silica or magnesium chloride as a support also results in support material largely remaining in the product, which can affect the product properties, such as optical properties, or processing.

One of the objectives of the present invention is to provide a catalyst which overcomes the difficulties encountered in the prior art.

SUMMARY OF THE INVENTION

The present invention provides a catalyst component comprising at least one metallocene compound, one magnesium compound and defined polymer particles. The polymer particles used in catalyst preparation have a mean particle diameter of about 5 to about 1000 μm, a pore volume of at least 0.1 cm$^3$/g and a pore diameter at least 20 Angstroms or from about 20 to about 10,000 Angstroms, preferably from about 500 to about 10,000 Angstroms, and a surface area from about 0.1 m$^2$/g to about 100 m$^2$/g, preferably from about 0.2 m$^2$/g to about 15 m$^2$/g. The catalyst component, when used in conjunction with an organoaluminum compound or a mixture of organoaluminum compounds, can be used for olefin polymerization to produce linear low, medium and high density polyethylenes and copolymers of ethylene with alpha-olefins having about 3 to 18 carbon atoms.

DETAILED DESCRIPTION OF THE INVENTION

The solid catalyst component (catalyst precursor) used in the present invention contains at least one metallocene compound, one magnesium compound and a polymeric material having a mean particle diameter of about 5 to about 1000 μm, a pore volume of at least 0.1 cm$^3$/g and a pore diameter of at least 20 Angstroms or from about 20 to about 10 000 Angstroms, preferably from 500 to 10,000 Angstroms and a surface area from about 0.1 m$^2$/g to about 100 m$^2$/g, preferably from about 0.2 m$^2$/g to about 15 m$^2$/g.

At least one metallocene compound is used for the preparation of the catalyst in the present invention. The metallocenes used can be represented by the general formula $(Cp)_zMX_y$, wherein Cp represents a unsubstituted or substituted cyclopentadienyl ring, M represents titanium, zirconium or vanadium, X represents a halogen atom, and $1 \leq z \leq 2$, $2 \leq y \leq 3$. The cyclopentadienyl ring may be unsubstituted or substituted with a hydrocarbyl radical such as alkyl, alkenyl, aryl containing 1 to 20 carbon atoms, such as methyl, ethyl, propyl, amyl, isoamyl, isobutyl, phenyl and the like.

Preferred metallocene compounds include the following non-limiting examples: bis(cyclopentadienyl)titanium dichloride, cyclopentadienyltitanium trichloride, bis(cyclopentadienyl)zirconium dichloride, cyclopentadienylzirconium trichloride.

The magnesium compounds used for catalyst synthesis in the invention include Grignard compounds represented by the general formula $R^1MgX$, wherein $R^1$ is a hydrocarbon group of 1 to 20 carbon atoms and X is a halogen atom, preferably chlorine. Other preferred magnesium compounds are represented by the general formula $R^2R^3Mg$, wherein $R^2$ and $R^3$ are each a hydrocarbon group of 1 to 20 carbon atoms.

Preferred magnesium compounds include the following non-limiting examples: dialkylmagnesium such as diethylmagnesium, dipropylmagnesium, di-isopropylmagnesium, di-n-butylmagnesium, di-isobutylmagnesium, butylethylmagnesium, dihexylmagnesium, dioctylmagnesium; alkyl magnesium chloride such as ethylmagnesium chloride, butylmagnesium chloride, hexylmagnesium chloride and the like.

The polymer particles used in the present invention are in the form of distinct particles which are preferably spherical, and on which the active catalyst component is chemically bonded, wherein the ratio of active catalyst component to polymeric support is less than 1% by weight. In contrast, metallocene catalysts supported on silica rely either on physical impregnation of the catalyst active sites on the support or on a bonding that readily allows the catalyst active sites on the support to be extracted, resulting in the production of fines or polymer of poor morphology.

The polymer particles used in the catalyst of the present invention preferably have a spherical shape with a mean particle diameter from about 5 to about 1000 μm, a pore volume of at least 0.1 cm³/g and a pore diameter of at least from 20 Angstroms or from about 20 to about 10,000 Angstroms, preferably from about 500 to 10,000 Angstroms and a surface area from about 0.1 m²/g to about 100 m²/g, preferably from about 0.2 m²/g to about 15 m²/g.

Examples of the polymeric materials used as supports in the catalyst composition of the present invention include thermoplastic polymers. Polymer particles of polyvinylchloride are preferred, and non-crosslinked polyvinylchloride particles are most preferred.

The polymer particles used in the present invention have surface active sites such as labile chlorine atoms. Preferably, these active sites are reacted stoichiometrically with the organometallic compound, namely a magnesium containing compound.

The use of the polymer particles in catalyst preparation herein offers significant advantages over traditional olefin polymerization catalysts using supports such as silica or magnesium chloride. In comparison to a silica supported catalyst, the polymer particles require no high temperature and prolonged dehydration steps prior to their use in catalyst synthesis, thereby simplifying the synthesis process and thus reducing the overall cost of catalyst preparation. Furthermore, the cost of the polymeric support used in the present invention is substantially less than silica or magnesium chloride supports. In addition, unlike the preparation of silica supported metallocene catalysts, the preparation of the catalyst precursor of the present invention does not require organoaluminum compounds. The synthesis of the solid catalyst component in the present invention involves introducing the polymeric material described above into a vessel and adding a diluent. Suitable diluents include organic solvents, preferably isopentane, hexane, cyclohexane, heptane, isooctane or pentamethylheptane. The polymeric material is then treated with a magnesium compound described above at a temperature in the range of about 20° C. to about 110° C. The ratio of magnesium compound to the polymer support can be in the range of about 0.05 mmol to about 20 mmol per gram polymer, preferably about 0.1 to about 10 mmol per gram polymer, and more preferably about 0.2 mmol to about 2 mmol per gram polymer. The solvent is then vaporized using a nitrogen purge at a temperature in the range of about 20° C. to 80° C.

The resulting free flowing solid product is then slurried. Suitable solvents for slurrying include organic solvents, preferably hexane, cyclohexane, heptane, isooctane and pentamethylheptane. The magnesium modified polymeric material is then treated with a metallocene compound described above at a temperature in the range of about 20° C. to about 120° C. Cyclopentadienyltitanium trichloride, cyclopentadienylzirconium trichloride, dicyclopentadienyltitanium dichloride and dicyclopentadienylzirconium dichloride are the preferred metallocene compounds. The solid catalyst component product is then washed with a suitable solvent such as isopentane, hexane, cyclohexane, heptane, isooctane and pentamethylheptane. The solid catalyst component is dried using a nitrogen purge at a temperature in the range of about 20° C. to about 100° C., preferably about 30° C. to about 80° C.

The thus-formed catalyst component is activated with suitable activators, also known as co-catalysts or catalyst promoters for olefin polymerization. The preferred compounds for activation of the solid catalyst component are organoaluminum compounds. The catalyst composition of this invention is not subjected to halogenation, e.g., chlorination treatments.

The catalyst can be activated by organoaluminum compounds represented by the general formula $R^4{}_nAlX_{3-n}$, wherein $R^4$ represents a hydrocarbon group having 1 to 10 carbon atoms, X represents a halogen atom or an alkoxy group, and n represents a number satisfying $0 \leq n \leq 3$. Illustrative but non-limiting examples of the organoaluminum compounds include trialkylaluminums such as trimethylaluminum, triethylaluminum, triisobutylaluminum, tri-n-hexylaluminum; dialkylaluminum chloride such as dimethylaluminum chloride, diethylaluminum chloride; alkylaluminum dichloride such as methylaluminum dichloride, ethylaluminum dichloride; dialkylaluminum methoxide such as dimethylaluminum methoxide, diethylaluminum ethoxide. The preferred activators of the above general formula are trimethylaluminum, triethylaluminum, triisobutylaluminum and tri-n-hexylaluminum.

The catalyst of the present invention may also be suitably activated with an aluminoxane represented by the general formula $R^5R^6Al$—O—$AlR^7R^8$, where $R^5$, $R^6$, $R^7$ and $R^8$ are either the same or different linear, branched or cyclic alkyl group of 1 to 12 carbons; such as methyl, ethyl, propyl or isobutyl. The preferred examples are methylaluminoxane and modified methylaluminoxane (MMAO).

Mixtures of alkylaluminum compounds and aluminoxanes compounds described above can also be conveniently used for catalyst activation. The alkylaluminum compound and/or aluminoxane compounds in this invention can be used in the range of about 1 to about 3000 moles of aluminum per one mole of transition metal in the said catalyst, and more preferably in the range of about 50 to 1500 moles per one mole of transition metal.

The catalyst system described in the present invention can operate in polymerizing alpha-olefins in slurry and gas phase processes. Gas phase polymerization can be carried out in stirred bed reactors and in fluidized bed reactors. A pressure in the range of about 5 to 40 bars is suitable for the polymerization, preferably about 10 to about 35 bar. Suitable polymerization temperatures are in the range of about 30° C. to about 110° C., preferably about 50° C. to about 95° C. In addition to polyethylene homopolymer, ethylene copolymers with $C_3$–$C_{10}$ alpha-olefins are readily prepared by the present invention. Particular examples include ethylene/propylene, ethylene/1-hexene, ethylene/1-butene, ethylene/1-octene and ethylene/4-methyl-1-pentene.

EXAMPLES

The following examples are intended to be illustrative of this invention. They are, of course, not to be taken in any way as limiting on the scope of this invention. Numerous changes and modifications can be made without departing from the spirit of the invention.

Example 1
Synthesis of Butyl Magnesium Chloride (Grignard Reagent)

A three-necked round bottom flask, equipped with a nitrogen inlet, a thermometer, a reflux condenser and a dropping funnel, was purged with nitrogen for 30 minutes at 110° C. and then 12 g of magnesium turnings were added to the flask. A crystal of iodine was added, followed by 255 $cm^3$ of dibutylether. Then 53.0 $cm^3$ of butylchloride was gradually added to the flask over a period of 45 minutes, while stirring and maintaining the temperature at 105° C. The resulting mixture in the flask was stirred for 90 minutes after the completion of butylchloride addition at 105° C. Then 400 $cm^3$ of n-heptane was added and stirring was carried out for a further 90 minutes at 105° C. The reaction mixture was cooled to room temperature, and the solid matter was filtered off.

A sample of the butylmagnesium chloride solution was analyzed using a Mettler Autotitrator. Thus, the concentration of n-butylmagnesium chloride was determined to be 0.68 M.

Synthesis of Catalyst A

To a three-necked round bottom flask, equipped with a condenser and stirrer, was added 5.0 g of polyvinylchloride (supplied by SABIC, Saudi Arabia) spheres of 76 um average particle size. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 $cm^3$ of isopentane. Then 3 $cm^3$ of butylmagnesium chloride (synthesized above) was added to the slurry and the resultant mixture was stirred for 60 minutes at 45° C., under reflux conditions. The isopentane was evaporated to obtain a free flowing powder by using a nitrogen purge at 50° C.

Then the magnesium-modified polyvinylchloride was slurried using 30 $cm^3$ of isooctane, a $CpTiCl_3$ solution (1.0 g in 15 $cm^3$ toluene) was added, and the resulting mixture was stirred at 70° C. for 60 minutes. The supernatant liquid was decanted and the resulting solid product was washed by stirring with 50 $cm^3$ of isooctane and then removing the isooctane, then washed again with 50 $cm^3$ of isooctane. The resulting solid was further washed with 50 $cm^3$ of isopentane, then washed again with a 50 $cm^3$ of isopentane. Finally, the solid catalyst was dried using a nitrogen purge to yield a free-flowing yellow colored solid product. The solid catalyst component was analyzed by atomic adsorption spectroscopy and was found to contain 0.49% by weight of titanium atoms and 0.83% by weight of magnesium atoms.

Example 2
Synthesis of Catalyst B

To a three-necked round bottom flask, equipped with a condenser and stirrer, was added 5.0 g of polyvinylchloride (supplied by SABIC, Saudi Arabia) spheres of 76 μm average particle size. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 $cm^3$ of isopentane. Then 1.0 $cm^3$ of butylmagnesium chloride (Aldrich, 2.0 molar in diethylether) was added to the slurry and the resultant mixture was stirred for 60 minutes at oil bath temperature of 45° C., under reflux conditions. The isopentane was evaporated to obtain a free flowing powder by using a nitrogen purge at 50° C.

Then the magnesium-modified polyvinylchloride was slurried using 30 $cm^3$ of isooctane and a $CpTiCl_3$ solution (11.0 g in 15 $cm^3$ toluene) was added, and the resulting mixture was stirred at 70° C. for 60 minutes. The supernatant liquid was decanted and the resulting solid product was washed by stirring with 50 $cm^3$ of isooctane and then removing the isooctane, then washed again with 50 $cm^3$ of isooctane. The resulting solid was further washed with 50 $cm^3$ of isopentane, then washed again with a 50 $cm^3$ of isopentane. Finally, the solid catalyst was dried using a nitrogen purge to yield a free-flowing yellow colored solid product. The solid catalyst component was analyzed by atomic adsorption spectroscopy and was found to contain 0.64% by weight of titanium atoms and 0.89% by weight of magnesium atoms.

Example 3
Synthesis of Catalyst C

To a three-necked round bottom flask, equipped with a condenser and stirrer, was added 5.0 g of polyvinylchloride (supplied by SABIC, Saudi Arabia) spheres of 76 μm average particle size. The flask containing the polyvinylchloride was heated up to 70° C. using an oil bath and then evacuated at 30 mm Hg pressure for 30 minutes. The flask and its contents were then purged with dried nitrogen and the polyvinylchloride was slurried using 30 $cm^3$ of isopentane. Then 1.0 $cm^3$ of butylmagnesium chloride (Aldrich, 2.0 molar in diethylether) was added to the slurry and the resultant mixture was stirred for 60 minutes at an oil bath temperature of 45° C., under reflux conditions. The isopentane was evaporated to obtain a free flowing powder by using a nitrogen purge at 50° C.

Then the magnesium-modified polyvinylchloride was slurried using 30 $cm^3$ of isooctane and a $Cp_2TiCl_2$ solution (1.0 g in 15 $cm^3$ toluene) was added, and the resulting mixture was stirred at 70° C. for 60 minutes. The supernatant liquid was decanted and the resulting solid product was washed by stirring with 50 $cm^3$ of isooctane and then removing the isooctane, then washed again with 50 $cm^3$ of isooctane. The resulting solid was further washed with 50 $cm^3$ of isopentane, then washed again with a 50 $cm^3$ of isopentane. Finally, the solid catalyst was dried using a nitrogen purge to yield a free-flowing yellow colored solid product. The solid catalyst component was analyzed by atomic adsorption spectroscopy and was found to contain 0.11% by weight of titanium atoms and 0.91% by weight of magnesium atoms.

Examples 4–6
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then the desired quantity of MMAO solution (7 wt % Al) described in Table 1, was introduced to the reactor. This was followed by injection of 0.2 g of the solid catalyst "A" described in Example 1 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 1 hour, with ethylene supplied on demand to maintain the total reactor pressure at 15 barg. Results are shown in Table 1.

TABLE 1

The Effect of MMAO Concentration

| Example | MMAO (cm³) | Yield (g) | Productivity (gPE/g catalyst) | Activity (gPE/mmol Ti h 100 Psig C2) |
|---|---|---|---|---|
| 4 | 3 | 197 | 985 | 5470 |
| 5 | 5 | 236 | 1180 | 6550 |
| 6 | 7 | 265 | 1325 | 7360 |

MMAO is modified methyl aluminoxane

Example 7
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then 5.0 cm³ of 1 M TIBAL was injected into the reactor. This was followed by injection of 0.2 g of the solid catalyst "A" described in Example 1 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 1 hour, with ethylene supplied on demand to maintain the total reactor pressure at 15 barg. 198 grams of polyethylene were recovered. The catalyst productivity was 990 gPE/g catalyst and the catalyst activity was calculated to be 5500 g PE/mmol Ti h 100 Psig C2.

Example 8
Polymerization

An autoclave with a volume of 2 liters was purged with nitrogen at 180° C. for 30 minutes. After cooling the autoclave to 60° C., one liter of hexane was introduced to the reactor, followed by purging with hydrogen. The reactor temperature was raised to 85° C. The hydrogen pressure was adjusted until the pressure reached 3 barg. Then 5.0 cm³ of IM TIBAL was injected into the reactor. This was followed by injection of 0.2 g of the solid catalyst "A" described in Example 1 after being slurried in 20 cm³ of n-hexane solvent. The catalyst was then preactivated with TIBAL by stirring the contents of the reactor for thirty minutes at 85° C. Then ethylene was introduced to the reactor such as to raise the reactor pressure to 15 barg. The polymerization was carried out for 1 hour; with ethylene supplied on demand to maintain the total reactor pressure at 15 barg. 286 grams of polyethylene were recovered. The catalyst productivity was 1430 gPE/g catalyst and the catalyst activity was calculated to be 7940 g PE/mmol Ti h 100 Psig C2.

Example 9
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then 5.0 cm³ of 1M TnHAL was injected into the reactor. This was followed by injection of 0.2 g of the solid catalyst "A" described in Example 1 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 1 hour; with ethylene supplied on demand to maintain the total reactor pressure at 15 barg. 173 grams of polyethylene were recovered. The catalyst productivity was 865 gPE/g catalyst and the catalyst activity was calculated to be 4800 g PE/mmol Ti h 100 Psig C2.

Example 10
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then 3.0 cm³ of 1M TIBAL and 3.0 cm³ of MMAO solution (7 wt % Al) were injected into the reactor. This was followed by injection of 0.2 g of the solid catalyst "A" described in Example 1 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 30 minutes; with ethylene supplied on demand to maintain the total reactor pressure at 15 barg. 222 grams of polyethylene were recovered. The catalyst productivity was 1110 gPE/g catalyst and the catalyst activity was calculated to be 12330 g PE/mmol Ti h at 100 Psig C2.

Examples 11–12
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then the desired quantity of MMAO solution (7 wt % Al) described in Table 2, was introduced to the reactor. This was followed by injection of 0.1 g of the solid catalyst "B" described in Example 2 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 1 hour; with ethylene supplied on demand to maintain the total reactor pressure at 15 barg. Results are described in Table 2.

TABLE 2

The Effect of MMAO Concentration

| Example | MMAO (cm³) | Yield (g) | Productivity (gPE/g catalyst) | Activity (gPE/mmol Ti h 100 Psig C2) |
|---|---|---|---|---|
| 11 | 5 | 282 | 2820 | 12000 |
| 12 | 7 | 310 | 3100 | 13180 |

Example 13
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then 5.0 cm³ of 1M TIBAL was injected into the reactor. This was followed by injection of 0.1 g of the solid catalyst "B" described in Example 2 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 1 hour; with ethylene supplied on demand to maintain the total reactor pressure at 15 barg. 241 grams of polyethylene were recovered. The catalyst productivity was 2410 gPE/g catalyst and the catalyst activity was calculated to be 10250 g PE/mmol Ti h 100 Psig C2.

Example 14
Polymerization

An autoclave with a volume of 2 liters was purged with nitrogen at 180° C. for 30 minutes. After cooling the autoclave to 60° C., one liter of hexane was introduced to the reactor, followed by purging with hydrogen. The reactor temperature was raised to 85° C. The hydrogen pressure was adjusted until the pressure reached 3 barg. Then 5.0 cm³ of 1M TIBAL was injected into the reactor. This was followed by injection of 0.1 g of the solid catalyst "B" described in Example 2 after being slurried in 20 cm³ of n-hexane solvent. The catalyst was then preactivated with TIBAL by stirring the contents of the reactor for thirty minutes at 85° C. Then ethylene was introduced to the reactor such as to raise the reactor pressure to 15 barg. The polymerization was carried out for 1 hour, with ethylene supplied on demand to maintain the total reactor pressure at 15 barg. 300 grams of polyethylene were recovered. The catalyst productivity was 3000 gPE/g catalyst and the catalyst activity was calculated to be 12760 g PE/mmol Ti h 100 Psig C2.

Example 15
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then the desired quantity of 1 M TIBAL, described in Table 3, was introduced to the reactor. This was followed by injection of 0.1 g of the solid catalyst "B" described in Example 2 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 1 hour, with ethylene supplied on demand to maintain the total reactor pressure at 15 barg. Results are described in Table 3.

TABLE 3

The Effect of TIBAL Concentration

| Example | TIBAL (mmol) | Yield (g) | Productivity (gPE/g catalyst) | Activity (gPE/mmol Ti h 100 Psig C2) |
|---|---|---|---|---|
| 13 | 5 | 241 | 2410 | 10250 |
| 15 | 7 | 240 | 2400 | 10210 |

TIBAL is triisobutylaluminum.

Example 16–18
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then a mixture of IM TIBAL and MMAO solution (7 wt % Al), as described in Table 4, was injected into the reactor. This was followed by injection of 0.1 g of the solid catalyst "B" described in Example 2 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 1 hour, with ethylene supplied on demand to maintain the total reactor pressure at 15 barg. Results are described in Table 4.

TABLE 4

The Effect of TIBAL and MMAO Mixture

| Example | TIBAL (mmol) | MMAO (cm³) | Yield (g) | Productivity (gPE/g catalyst) | Activity (gPE/mmol Ti h 100 Psig C2) |
|---|---|---|---|---|---|
| 16 | 1 | 4 | 311 | 3110 | 13230 |
| 17 | 2.5 | 2.5 | 342 | 3420 | 14540 |
| 18 | 4 | 1 | 324 | 3240 | 13780 |

Example 19
Polymerization

An autoclave with a volume of 2 liters was purged with nitrogen at 180° C. for 30 minutes. After cooling the autoclave to 60° C., one liter of hexane was introduced to the reactor, followed by purging with hydrogen. Then 5.0 cm³ of MMAO solution (7 wt % Al) were injected into the reactor. This was followed by injection of 0.1 g of the solid catalyst "C" described in Example 3 after being slurried in 20 cm³ of n-hexane solvent. The reactor temperature was raised to 85° C. and the hydrogen pressure was then adjusted until the pressure reached 3 barg. Ethylene was introduced to the reactor such as to raise the reactor pressure to 15 barg, and polymerization was carried out for 30 minutes; with ethylene supplied on demand to maintain the total reactor pressure at 15 barg. 88 grams of polyethylene were recovered. The catalyst productivity was 880 gPE/g catalyst and the catalyst activity was calculated to be 21770 g PE/mmol Ti h at 100 Psig C2.

We claim:

1. A catalyst composition for polymerization of olefins comprising:
   A) a solid catalyst precursor consisting essentially of a metallocene compound represented by the formula $(Cp)_zTiX_y$, wherein Cp represents an unsubstituted or substituted cyclopentadienyl ring, X represents a halogen atom, z is 1 or 2, and y is 2 or 3, a magnesium compound represented by the formula $R_aMgX_{2-a}$ wherein R is a hydrocarbyl group having 1 to 20 carbon atoms, X is a halogen atom, and a is 1 or 2, and a polymeric support; and
   B) a cocatalyst comprising an aluminum compound.

2. The catalyst composition of claim 1, wherein the cyclopentadienyl ring is substituted with a hydrocarbyl selected from the group consisting of alkyl, alkenyl and aryl containing 1 to 20 carbon atoms.

3. The catalyst composition of claim 2, wherein the hydrocarbyl sustituent for the cyclopentadienyl ring is selected from the group consisting of methyl, ethyl, propyl, amyl, isoamyl, isobutyl, phenyl and combinations thereof.

4. The catalyst composition of claim 1, wherein the metallocene compound is bis(cyclopentadienyl)titanium dichloride or cyclopentadienyltitanium trichloride.

5. The catalyst composition of claim 1, wherein the polymeric support comprises particles having a mean particle diameter of 5 to 1000 μm, a pore volume of at least 0.1 cm$^3$/g, a pore diameter of from about 20 to about 10,000 angstroms and a surface area from about 0.1 m$^2$/g to about 100 m$^2$/g; and the aluminum compound is selected from the group consisting of alkylaluminums and aluminoxanes.

6. The catalyst composition of claim 5, wherein the polymeric support has a pore diameter from about 500 to 10,000 angstroms and a the surface area from about 0.2 m$^2$/g to about 15 m$^2$/g.

7. The catalyst composition of claim 6, wherein the polymeric support comprises polyolefin, polyvinylchloride, polyvinylalcohol or polycarbonate.

8. The catalyst composition of claim 7, wherein the polymeric support comprises polyvinylchloride.

9. The catalyst composition of claim 7, wherein the magnesium compound is diethylmagnesium, dibutylmagnesium, butylethylmagnesium, dihexylmagnesium, butyloctyl magnesium, ethylmagnesium chloride, butylmagnesium chloride, hexylmagnesium chloride or mixtures thereof.

10. The catalyst composition of claim 1, wherein the aluminum compound is represented by the general formula R$^4_n$AlX$_{3-n}$, wherein R$^4$ represents a hydrocarbyl group having 1 to 10 carbon atoms; X represents a halogen atom and n is 0, 1, 2 or 3.

11. The catalyst composition of claim 10, wherein the aluminum compound comprises trimethylaluminum, triethylaluminum, triisobutylaluminum or tri n-hexylaluminum.

12. The catalyst composition of claim 9, wherein the aluminum compound is an aluminoxane represented by the general formula R$^5$R$^6$Al—O—AlR$^7$R$^8$ where R$^5$, R$^6$, R$^7$ and R$^8$ each represent a hydrocarbyl group having 1 to 10 carbon atoms.

13. The catalyst composition of claim 12, wherein the aluminoxane comprises methyl aluminoxane or modified methyl aluminoxane.

14. The catalyst composition of claim 5, wherein the ratio of moles of aluminum in the cocatalyst to moles of transition metal in the catalyst precursor is about 50 to 1 to about 3000 to 1.

15. A process for polymerizing olefins, comprising contacting olefins with the catalyst composition of claim 1 under olefin polymerization conditions.

16. The process of claim 15, wherein the polymerization comprises homopolymerization or copolymerization of α-olefins.

17. The process of claim 16, wherein the α-olefins are propylene, 1- butene, 1-pentene, 1-hexene, 1-heptene or 1-octene or mixtures thereof.

18. The process of claim 15, wherein the polymeric support comprises polymer particles having a mean particle diameter from about 5 to about 1000 μm, a pure volume of at least 0.1 cm$^3$/g, a pore diameter from about 20 to about 10,000 angstroms, and a surface area from about 0.1 m$^2$/g to about 100 m$^2$g/;and the aluminum compound is selected from the group consisting of alkylaluminums, aluminoxanes and combinations thereof.

19. The process of claim 15, wherein the cyclopentadienyl ring is substituted with a hydrocarbyl selected from the group consisting of alkyl, alkenyl and aryl containing 1 to 20 carbon atoms.

20. The process of claim 19, wherein the cyclopentadienyl ring is substituted with a hydrocarbyl selected from the group consisting of methyl, ethyl, propyl, amyl, isoamyl, isobutyl, phenyl and combinations thereof.

21. The process of claim 18, wherein the metallocene compound is bis(cyclopentadienyl)titanium dichloride, cyclopentadienyltitanium trichloride or a mixture thereof.

22. The process of claim 18, wherein the polymer particles have a pore diameter from about 500 to 10,000 angstroms and a surface area from about 0.2 /g to about 15 m$^2$/g.

23. The process of claim 18, wherein the polymer particesl are polyolefin, polyvinylchloride, polyvinylalcohol or polycarbonate.

24. The process of claim 23, wherein the magnesium compound is diethylmagnesium, dibutylmagnesium, butylethylmagnesium, dihexylmagnesium, butyloctyl magnesium, ethylmagnesium chloride, butylmagnesium chloride, hexylmagnesium chloride or mixtures thereof.

25. The process of claim 18, wherein the magnesium compound is diethylmagnesium, dibutylmagnesium, butyethylmagnesium, dihexylmagnesium, butylocytl magnesium, ethylmagnesium chloride, butylmagnesium chloride, hexylmagnesium chloride or mixtures thereof.

26. The process of claim 18, wherein the alkylaluminums are represented by the general formula R$^4$nAIX$_3$, wherein R$^4$ represents a hydrocarbyl group having 1 to 10 carbon atoms; X represents a halogen atom and n is 0, 1, 2, or 3.

27. The process of claim 26, wherein the alkylaluminums are trimethylaluminum, triethylaluminum, triisobutylaluminum or tri n-hexylaluminum.

28. The process of claim 18, wherein the aluminoxanes are represented by the general formula R$^5$R$^6$Al-O-AlR$^7$R$^8$where R$^5$, R$^{6, R7}$ and R$^8$each represents a hydrocarbyl group having 1 to 10 carbon atoms.

29. The process of claim 18, wherein the aluminoxanes are methyl aluminoxane or MMAO.

30. The process of claim 18, wherein the cocatalyst is in an amount of about 50 to about 3000 in terms of moles of aluminium in the cocatalyst to moles transdition metal in the catalyst precursor.

* * * * *